(12) United States Patent
Whitfield

(10) Patent No.: US 9,821,644 B1
(45) Date of Patent: Nov. 21, 2017

(54) VEHICLE PROTECTION ASSEMBLY

(71) Applicant: Delia Whitfield, Euless, TX (US)

(72) Inventor: Delia Whitfield, Euless, TX (US)

( * ) Notice: Subject to any disclaimer, the term of this patent is extended or adjusted under 35 U.S.C. 154(b) by 0 days.

(21) Appl. No.: 15/152,553

(22) Filed: May 12, 2016

(51) Int. Cl.
*B60J 11/04* (2006.01)

(52) U.S. Cl.
CPC .................................... *B60J 11/04* (2013.01)

(58) Field of Classification Search
CPC ................................. B60J 11/00; B60J 11/06
USPC ............ 296/136.02, 95.1, 77.1, 98, 81, 35.2
See application file for complete search history.

(56) References Cited

U.S. PATENT DOCUMENTS

| | | | |
|---|---|---|---|
| 4,699,192 A | 10/1987 | Kamen et al. | |
| 4,807,922 A | 2/1989 | Glover | |
| 5,312,145 A * | 5/1994 | McNeil | B60J 11/06 29/428 |
| 5,401,074 A | 3/1995 | Timmerman | |
| 5,800,006 A | 9/1998 | Pettigrew | |
| 5,820,201 A * | 10/1998 | Jabalee | B60J 11/06 150/166 |
| 6,145,617 A * | 11/2000 | Alts | B32B 5/18 181/286 |
| 6,220,648 B1 | 4/2001 | Daniel | |
| D468,256 S | 1/2003 | Wright | |
| 6,588,827 B2 * | 7/2003 | Heiland | B60J 11/00 150/166 |
| 6,893,074 B1 | 5/2005 | Wilson | |
| 6,964,446 B2 * | 11/2005 | Porter | B60J 11/02 150/166 |
| 7,182,391 B2 * | 2/2007 | Thrasher | B60J 11/00 296/136.02 |
| 7,699,380 B2 | 4/2010 | Coleman | |
| 8,146,984 B2 | 4/2012 | Devereaux | |
| 8,479,787 B1 * | 7/2013 | Sahadeo | B60J 11/04 150/154 |
| 2014/0083579 A1 * | 3/2014 | White | A44B 99/00 150/154 |

* cited by examiner

*Primary Examiner* — Glenn Dayoan
*Assistant Examiner* — Sunsurraye Westbrook

(57) ABSTRACT

A vehicle protection assembly includes a tarp that may be draped over a vehicle thereby facilitating the tarp to substantially cover the vehicle. The tarp is substantially comprised of a resiliently compressible material. Thus, the tarp may absorb impact energy thereby facilitating the tarp to protect the vehicle from the impact energy. The tarp is substantially comprised of a non abrasive material. Thus, the tarp may resist scratching the vehicle.

4 Claims, 3 Drawing Sheets

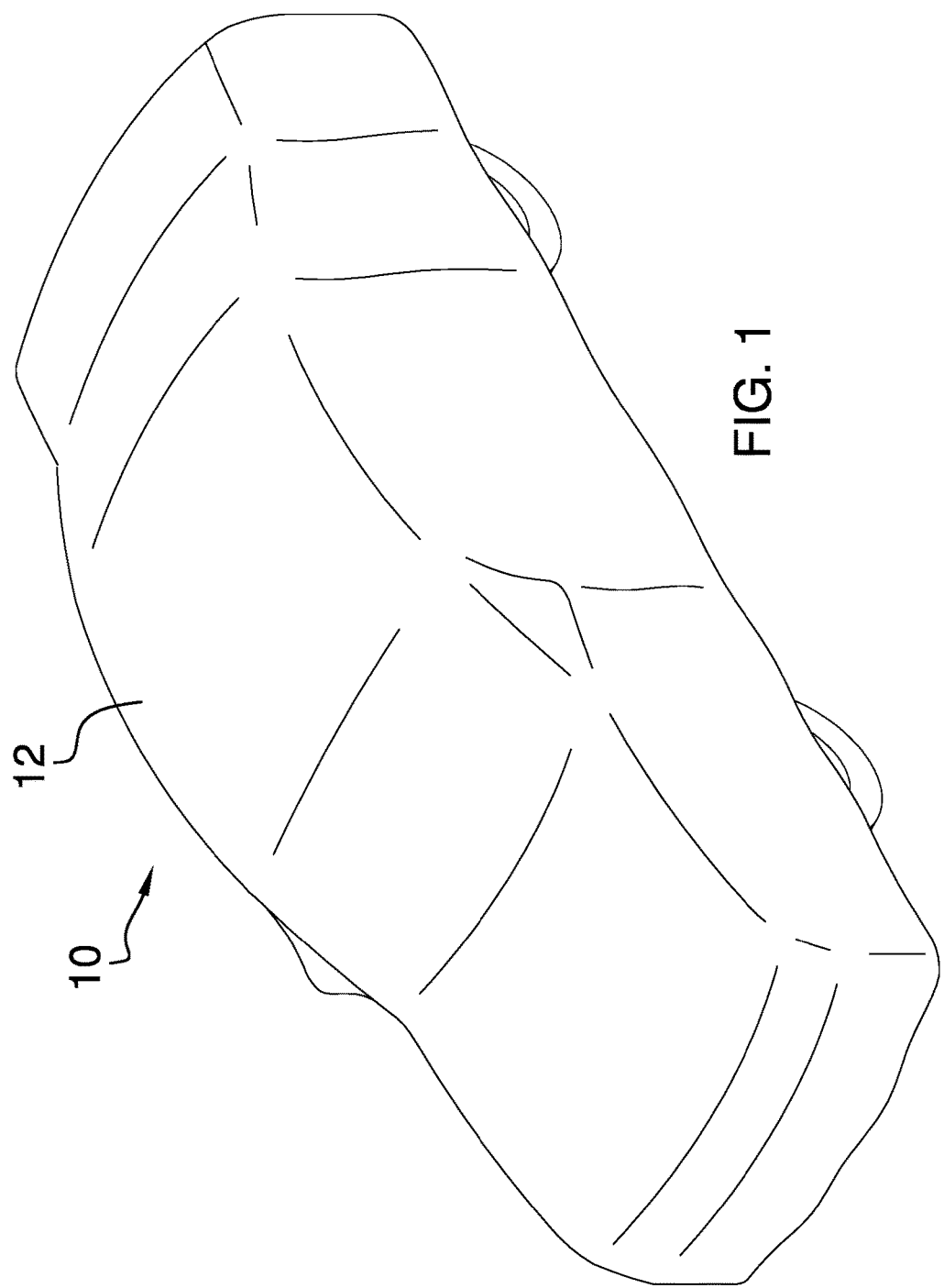

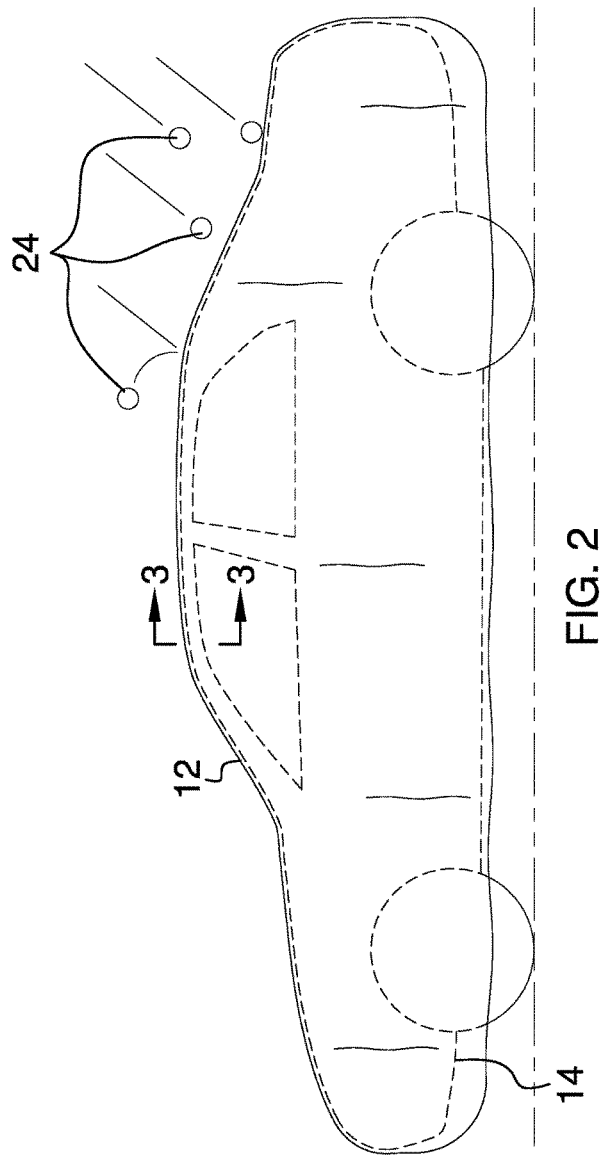
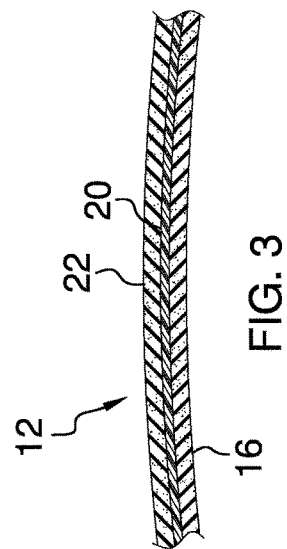

VEHICLE PROTECTION ASSEMBLY

BACKGROUND OF THE DISCLOSURE

Field of the Disclosure

The disclosure relates to tarp devices and more particularly pertains to a new tarp device for protecting a vehicle from impact damage.

SUMMARY OF THE DISCLOSURE

An embodiment of the disclosure meets the needs presented above by generally comprising a tarp that may be draped over a vehicle thereby facilitating the tarp to substantially cover the vehicle. The tarp is substantially comprised of a resiliently compressible material. Thus, the tarp may absorb impact energy thereby facilitating the tarp to protect the vehicle from the impact energy. The tarp is substantially comprised of a non abrasive material. Thus, the tarp may resist scratching the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top perspective view of a vehicle protection assembly according to an embodiment of the disclosure.

FIG. 2 is a perspective in-use view of an embodiment of the disclosure.

FIG. 3 is a cross sectional view taken along line 3-3 of FIG. 2 of an embodiment of the disclosure.

DESCRIPTION OF THE PREFERRED EMBODIMENT

Figure 4:
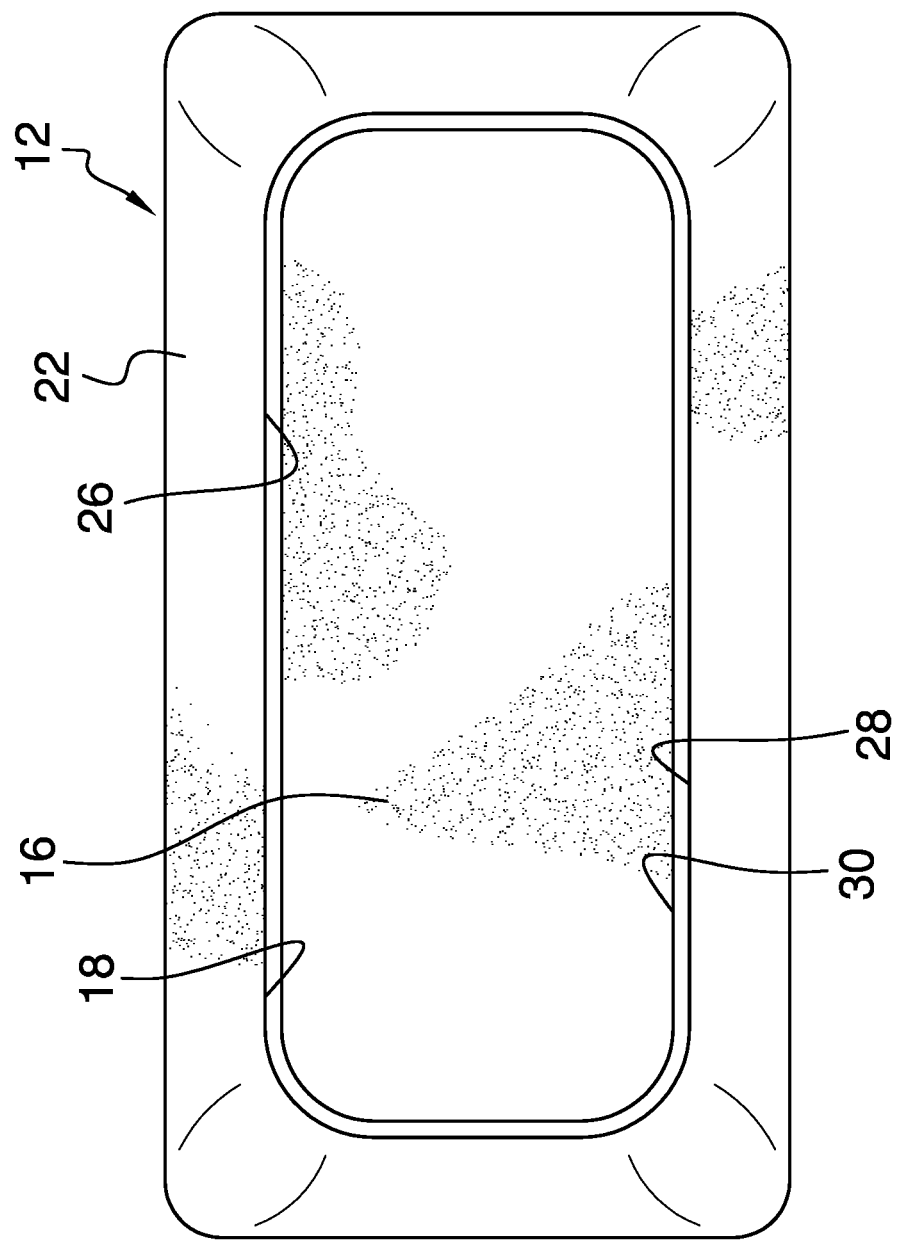
FIG. 4 is a bottom view of an embodiment of the disclosure.

With reference now to the drawings, and in particular to FIGS. 1 through 4 thereof, a new tarp device embodying the principles and concepts of an embodiment of the disclosure and generally designated by the reference numeral 10 will be described.

As best illustrated in FIGS. 1 through 4, the vehicle protection assembly 10 generally comprises a tarp 12 that may be draped over a vehicle 14 thereby facilitating the tarp 12 to substantially cover the vehicle 14. The vehicle 14 may be a passenger vehicle or the like. The tarp 12 is substantially comprised of a resiliently compressible material. Thus, the tarp 12 may absorb impact energy thereby facilitating the tarp 12 to protect the vehicle from the impact energy. The tarp 12 is substantially comprised of a non abrasive material. Thus, the tarp 12 may resist scratching the vehicle 14.

The tarp 12 includes a bottom layer 16. The bottom layer 16 abuts the vehicle 14 when the tarp 12 is positioned on the vehicle 14. The bottom layer 16 is comprised of a non abrasive material such as memory foam or the like. Thus, the bottom layer 16 resists scratching the vehicle 14 when the tarp 12 is positioned on the vehicle 14. The bottom layer 16 has a perimeter edge 18.

The tarp 12 includes a middle layer 20. The middle layer 20 is comprised of a fluid impermeable such as plastic or the like. Thus, the middle layer 20 inhibits moisture from contacting the vehicle 14 when the tarp 12 is positioned on the vehicle 14. The middle layer 20 may be coextensive with the bottom layer 16.

The tarp 12 includes a top layer 22. The top layer 22 is comprised of a resiliently compressible material such as memory foam or the like. Thus, the top layer 22 may absorb energy from a projectile 24 thereby inhibiting the projectile 24 from damaging the vehicle 14. The projectile 24 may comprise hail or the like. The top layer 22 has a peripheral edge 26. The peripheral edge 26 is coupled to the perimeter edge 18 of the bottom layer 16 to define an outer edge 28 of the tarp 12.

An elastic member 30 is coupled to the outer edge 28 of the tarp 12. The elastic member 30 urges the outer edge 28 to engage the vehicle 14 when the tarp 12 is positioned on the vehicle 14. Thus, elastic member 30 retains the tarp 12 on the vehicle 14. The elastic member 30 is comprised of a resiliently stretchable material.

In use, the tarp 12 is positioned on the vehicle 14 having the bottom layer 16 abut the vehicle 14. The tarp 12 is manipulated such that the outer edge 28 of the tarp 12 wraps beneath the vehicle 14. Thus, the elastic member 30 urges the outer edge 28 to engage the vehicle 14 thereby retaining the tarp 12 on the vehicle 14. The top layer 22 absorbs impact damage from the projectile 24 when the tarp 12 is on the vehicle 14. Thus, the tarp 12 inhibits the projectile 24 from denting or otherwise damaging the vehicle 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle protection assembly being configured to absorb impact damage thereby inhibiting a vehicle from impact damage, said assembly comprising:

a tarp being configured to be draped over a vehicle thereby facilitating said tarp to substantially cover the vehicle, said tarp being substantially comprised of a resiliently compressible material wherein said tarp is configured to absorb impact energy thereby facilitating said tarp to protect the vehicle from the impact energy, said tarp being substantially comprised of a non abrasive material wherein said tarp is configured to resist scratching the vehicle;

wherein said tarp comprises a bottom layer being configured to abut the vehicle when said tarp is positioned on the vehicle, said bottom layer being comprised of a non abrasive material wherein said bottom layer is configured to resist scratching the vehicle, said bottom layer having a perimeter edge;

wherein said tarp comprises a top layer being comprised of a resiliently compressible material wherein said top layer is configured to absorb energy from a projectile thereby inhibiting the projectile from damaging the vehicle; and wherein said tarp comprises a middle layer being comprised of a fluid impermeable material wherein said middle layer is configured to inhibit moisture from contacting the vehicle.

2. The assembly according to claim 1, said top layer having a peripheral edge, said peripheral edge being coupled to said perimeter edge of said bottom layer to define an outer edge of said tarp.

3. The assembly according to claim 2, further comprising an elastic member being coupled to said outer edge of said tarp, said elastic member being configured to urge said outer edge to engage the vehicle when said tarp is positioned on the vehicle thereby facilitating said tarp to be retained on the vehicle.

4. A vehicle protection assembly being configured to absorb impact damage thereby inhibiting a vehicle from impact damage, said assembly comprising:

a tarp being configured to be draped over a vehicle thereby facilitating said tarp to substantially cover the vehicle, said tarp being substantially comprised of a resiliently compressible material wherein said tarp is configured to absorb impact energy thereby facilitating said tarp to protect the vehicle from the impact energy, said tarp being substantially comprised of a non abrasive material wherein said tarp is configured to resist scratching the vehicle, said tarp comprising:

a bottom layer being configured to abut the vehicle when said tarp is positioned on the vehicle, said bottom layer being comprised of a non abrasive material wherein said bottom layer is configured to resist scratching the vehicle, said bottom layer having a perimeter edge;

a middle layer being comprised of a fluid impermeable material wherein said middle layer is configured to inhibit moisture from contacting the vehicle;

a top layer being comprised of a resiliently compressible material wherein said top layer is configured to absorb energy from a projectile thereby inhibiting the projectile from damaging the vehicle, said top layer having a peripheral edge, said peripheral edge being coupled to said perimeter edge of said bottom layer to define an outer edge of said tarp; and an elastic member being coupled to said outer edge of said tarp, said elastic member being configured to urge said outer edge to engage the vehicle when said tarp is positioned on the vehicle thereby facilitating said tarp to be retained on the vehicle.

\* \* \* \* \*